(12) United States Patent
Green

(10) Patent No.: US 7,063,185 B2
(45) Date of Patent: *Jun. 20, 2006

(54) SUPPORT HARNESS

(76) Inventor: Sherry Jean Green, 1904 Philadephia Rd., Jasper, GA (US) 30143

(*) Notice: Subject to any disclaimer, the term of this patent is extended or adjusted under 35 U.S.C. 154(b) by 0 days.

This patent is subject to a terminal disclaimer.

(21) Appl. No.: 10/992,990

(22) Filed: Nov. 19, 2004

(65) Prior Publication Data

US 2005/0139419 A1 Jun. 30, 2005

Related U.S. Application Data

(63) Continuation-in-part of application No. 10/463,641, filed on Jun. 17, 2003.

(60) Provisional application No. 60/390,801, filed on Jun. 20, 2002.

(51) Int. Cl.
*A62B 35/00* (2006.01)

(52) U.S. Cl. .......................................... 182/7; 182/187

(58) Field of Classification Search ............... 182/3–7, 182/187; 2/69, 81
See application file for complete search history.

(56) References Cited

U.S. PATENT DOCUMENTS

| | | | | | |
|---|---|---|---|---|---|
| 1,636,459 | A | * | 7/1927 | Chappel | 182/3 |
| 3,448,826 | A | * | 6/1969 | Rosenblum | 182/3 |
| 3,757,893 | A | * | 9/1973 | Hobbs | 182/6 |
| 4,446,943 | A | * | 5/1984 | Murray | 182/3 |
| 4,687,074 | A | * | 8/1987 | Green | 182/3 |
| 4,991,689 | A | * | 2/1991 | Cole | 182/3 |
| 5,136,724 | A | * | 8/1992 | Grilliot et al. | 2/81 |
| 5,183,007 | A | * | 2/1993 | Vincent | 119/770 |
| 6,128,782 | A | * | 10/2000 | Young et al. | 2/69 |
| 6,213,365 | B1 | * | 4/2001 | Stocke et al. | 224/665 |
| 6,223,854 | B1 | * | 5/2001 | Nolz | 182/3 |

* cited by examiner

*Primary Examiner*—Alvin Chin-Shue
(74) *Attorney, Agent, or Firm*—Akerman Senterfitt; Michael K. Dixon

(57) ABSTRACT

A harness system for supporting a person off of a ground surface. The harness system may include a seat supported by a strap attached to the seat. The strap may form one or more leg containing loops for keeping a person securely positioned in the harness. The harness may also include a climbing strap for securing the harness loosely to a support device, such as a tree, while a person climbs a support device. The harness may be secured to a person by tightening a waist strap around the person's waist. The harness system may include one or more modular pouches releasably coupled to the harness enabling the harness to be customized for a particular use. A shoulder strap may be used to prevent a user from falling out of the harness and to support the harness.

57 Claims, 7 Drawing Sheets

SUPPORT HARNESS

CROSS-REFERENCE TO RELATED APPLICATION

This application is a continuation-in-part of U.S. Utility patent application Ser. No. 10/463,641, filed Jun. 17, 2003, which claims the benefit of U.S. Provisional Application Ser. No. 60/390,801, filed Jun. 20, 2002.

FIELD OF THE INVENTION

The invention is directed generally to harnesses, and more particularly, to harnesses for suspending a person from a tree, tree limb, or other structure in a safe and comfortable manner.

BACKGROUND

Big-game hunting is a popular recreational activity pursued by hunters in many parts of the United States, Canada and else where in the world. Big-game animals typically include animals such as, but not limited to, elk, whitetail deer, blacktail deer, mule deer, wild hog, javelina, black bear, and brown bear. Many of these animals have a good sense smell and some have good eyesight. A popular method of harvesting many of these animals is by using a tree stand. A tree stand is a device that allows a hunter to remain motionless for many hours while being suspended above the ground anywhere between 10 feet to 50 feet above the ground. Tree stands may be found in many configurations. For instance, tree stands may be permanently attached to a tree and built from pressure treated lumber in a configuration dictated by the shape of a tree, but generally including a seat and platform. Tree stands may also be portable. Portable tree stands include ladder stands, climbing stands and hanging or lock-on tree stands. Typically portable tree stands are made of metal, such as aluminum or steel.

Yet another portable tree stand that has gained acceptance by hunters is a tree harness, as shown in U.S. Pat. No. 4,687,074, referred to as the '074 patent. The '074 patent discloses a tree harness having a flexible seat for supporting a person in a tree above the ground. The flexible seat, which is typically made of leather, fits around the buttocks and hips of a person. The seat is secured in place with a waist strap that is adjustable using a fastener, but only after disconnecting the fastener. The seat and person are supported by an adjustable support strap having a first end that loops around a portion of a tree, such as a limb or trunk, and a second end that loops around the waist strap used to secure the seat to a person. The adjustable support strap is secured to itself using a releasable hook.

The tree harness disclosed in the '074 patent accomplished the objective of suspending a person in a tree in such a position to allow the person to operate a firearm such as a rifle or bow and arrow. However, the tree harness of the '074 patent is difficult and unsafe to adjust while a person is seated in the tree harness and suspended from a tree. For instance, the tree harness provides no manner for securing the person to the tree while the person is connecting the adjustable support strap to a tree trunk or limb or while the person is climbing a tree. Furthermore, the waist strap may not be adjusted while a person is seated in the tree harness and suspended from a tree without first disconnecting the fastener in the waist strap and having the person lift himself from the seat by standing on a step or branch. Opening the fastener in the waist strap while suspended from a tree at any height is dangerous because there exists the possibility that the person could fall from the tree harness. In addition, the adjustable support strap that is wrapped around the tree and supports the seat may only be adjusted by removing the releasable clip from the adjustable support strap, which may only be accomplished by completely removing all weight from the adjustable support strap. Thus, the person must stand on a limb, step, or other item to accomplish this task. This is a very dangerous feat while hunting from a tree because the user must first properly secure a firearm and then must balance on a limb while attempting to disconnect the releasable clip, insert the releasable clip into a different hole, and reestablish a position in the seat without falling from the tree. Under most conditions this cannot be accomplished in a safe manner. In addition, the tree harness also includes pockets that are permanently attached to the tree harness. Such pouches are not adjustable and thus, are often unable to meet the needs of all hunters.

Therefore, there exists a need for a harness including safety features allowing a person to safely adjust various straps in a safe manner while being suspended off of the ground to obtain a comfortable position in the harness. In addition, there is a need for a harness system that enables hunters to customize the harness to meet the needs of the hunter.

SUMMARY OF THE INVENTION

This invention is directed to a harness capable of supporting a person off of a ground surface by hanging from a support object. In at least one embodiment of this invention, a harness supports a person from a tree in a position enabling the person to safely and effectively operate a firearm. In addition, the harness may be used for other uses including, but not limited to, harnesses for firefighters and other rescue personnel, tree pruners, utility workers performing work on power or other type utility poles, for repelling, such as by high rise window washers, and by other people needing to be safely suspended off of the ground.

The harness may include a seat that is supported by a hanging strap. The hanging strap may be coupled to a support object, which may be, but is not limited to a tree trunk, tree limb, pole or other object. The seat may be flexible and may support a person by cradling the buttocks and hips of the person. The seat may have a first top corner, a second top corner, a first side edge, and a second side edge opposite from the first side edge. The periphery of the seat may be reinforced with a strap that is configured to form two leg containing loops through which a person using the harness places his or her legs. In one embodiment, a first leg containing loop may be coupled to a first side edge, and a second leg containing loop may be coupled to a second side edge. The leg containing loops support the weight of the person in an emergency situation where the person has begun to fall from the harness. Otherwise, the leg containing loops do not support any weight. The ends of the strap may be coupled together in a single connection using a "WW" stitching pattern for maximum strength. One or more pouches may be coupled to the flexible seat in a modular fashion for storing various items for hunting, tree pruning, repelling, rescue operations, firefighting operations and the like. These pockets may be attached to the backside of the seat and may have a closure member for securing the contents of the pockets. The modular configuration of the pockets enables a user to customize the harness for a particular application.

The harness may include a climbing strap for connecting a person to a support object while the person is climbing the support object. The climbing strap may be formed from a first strap including a releasable hook, and a second strap including a fastener. The first and second straps may be wrapped around a support object and coupled together to keep the person from falling away from the support object while the person is climbing the tree and while the person is attaching the hanging strap to the support object. The climbing strap may be tightened around the support object by pulling a loose end of the second strap. The climbing strap include fasteners for tightening the climbing strap that may be located on either the first or second straps forming the climbing strap. The climbing strap need not be disconnected to be tightened. In another embodiment, the climbing strap may be adjusted by placing the attachment hardware through adjustment holes. The adjustment holes may be in one or both sides of the climbing belt. The adjustment holes prevent the possibility of the hook from becoming disengaged.

The harness may include a waist strap for coupling the seat of the harness to the hanging strap and for pulling the two sides of the harness together around the waist of a person. The waist strap may extend between the first top corner and the second top corner of the seat. The waist strap may include a top strap section and a bottom strap section. The waist strap may be tightened around a person's waist by pulling on the top strap section, which causes the bottom strap section and the periphery of the seat to tighten around the waist of the person and forms slack in the top waist strap. While the waist strap is adjustable, it may not be taken apart to form two separate straps. Rather, the waist strap is adjusted by pulling one side of the top or bottom strap section through the fastener. The slack formed in the top strap section is used to connect the harness to a support object using a hanging strap. Using the harness in this manner created a two point harness system. In an alternative embodiment, the top and bottom strap sections are adjusted to have generally even lengths. The loop formed by the top and bottom strap sections collectively may receive a hanging strap to support the harness using two interlocking loops. In yet another embodiment, the waist strap may be formed from a single, nonadjustable strap.

The hanging strap may be any strap capable of supporting the average weight of a person, but in the interest of safety, should be able to support 500 pounds or more. The hanging strap may include a releasable hook and a fastener capable of receiving the releasable hook. The hanging strap supports the weight of a person and is used to couple the harness to a support object. The hanging strap may be attached to a support object in many ways. In one embodiment, the hanging strap is attached to a support object by wrapping the strap around the support object one or more times and tying the end of the hanging strap having the releasable hook around the hanging strap. In this configuration, the releasable hook hangs over the portion of the hanging strap wrapped around the support object and hangs about 6 to about 16 inches beneath the tied portion of the hanging strap. The fastener may then be feed through the loop formed by the top strap section of the waist strap and attached to the releasable hook on the hanging strap. In the alternative embodiment, the fastener may be feed through the loop formed by the top and bottom strap sections collectively to form two interlocking loops. The person may then sit in the seat and be supported by the hanging strap.

This configuration forms two interlocking loops that are capable of rotating freely within each other. Specifically, both the hanging strap and the top strap section of the waist strap form loops. The interlocking loops are advantageous because the loops enable a person seated in the harness to move easily in relation to the support object.

The height of the seat when the harness is supported by the hanging strap may also be adjusted using the waist strap without disconnecting the hanging strap from the loop formed by the top strap section. Rather, the height of the seat may be adjusted using the fastener, which may be referred to as an adjuster buckle, while the hanging strap remains attached to the waist strap and to a tree or other object, thereby eliminating the possibility of the person falling from the tree while adjusting the height of the seat.

The harness may also include a shoulder harness. The shoulder harness may be capable of supporting the harness while the harness is attached to a user or may prevent a user from falling out of the harness. The shoulder harness may have a general Y-shaped configuration and a fastener for adjusting the length of the shoulder harness. The shoulder harness may have an adjustable fastener along the shoulder strap positioned proximate to a back of a user so as to not interfere with various tasks to be conducted by a user. In another embodiment, the shoulder harness may be integrated in a vest-type configuration attached to the seat of the harness or waist strap.

The harness system may also include one or more modular pouches. The modular pouches may be releasably coupled to the harness. In at least one embodiment, the modular pouch may be attached to pouch loops in the harness. The modular pouches enable the harness to be customized for a variety of applications. For instance, the modular pouches may be configured to have one or more pockets that may be closable with a variety of connectors.

An advantage of this harness is that that harness is configured to allow a person using the device to adjust the height at which the seat is positioned while hanging from a support device without detaching the harness from a tree or other support object, thereby eliminating the possibility of the person falling from the tree while adjusting the height of the seat.

Another advantage of this harness is that the harness includes a waist strap for securing the seat around the waist of a person. Moreover, the waist strap is adjustable while the harness is suspended in a tree without requiring the person to release the waist strap and be exposed to the danger of falling from the harness.

Yet another advantage of this harness is that the connection devices may be coated with a resilient material for eliminating metallic sounds, which spook game animals, and for protecting the connection devices from damaging effects of rain and the like.

Still another advantage of this harness is that the harness includes a climbing strap for preventing a person from falling from a tree while climbing a tree or while attaching the hanging strap to the tree.

Another advantage of this harness is that the climbing strap is adjustable and capable of accommodating people and trees of many sizes. In at least one embodiment, the climbing strap is advantageously designed such that the size of the climbing strap may be adjusted on both sides enabling the user to choose placement of the hardware.

Yet another advantage of this harness is that it may include one or more loops for holding gear while using the harness. The loops also enable each user to adjust a harness to accommodate the specific needs of a user. In addition, pouches, which may be adapted for specific uses, may be attached to the waist loops and may be positioned in convenient locations around the entire outer perimeter of a harness.

Another advantage of this harness is that the harness may be customized by attaching or removing modular pouches to the harness as needed. Thus, the harness need not be manufactured for one particular use. Rather, the harness may be modified by a user to match more than one particular task.

Still another advantage of this harness is that harness may include a shoulder strap that may accomplish at least two objectives. First, the shoulder strap may support a portion of the weight of the harness system when the harness is fastened to a waist of a user. Second, the shoulder strap may act as a safety restraint in preventing a user from falling out of the harness when the user is suspended by the harness.

Another advantage of this invention is that the shoulder harness may be adjustable such that the shoulder harness may be tightened against the shoulders of a user.

Yet another advantage of this invention is that the shoulder harness may be adjustable with a fastener located proximate to a backside of a user such that the fastener does not interfere with tasks performed by a user supported by the harness.

Another advantage of this invention is that the harness system may be made to be very lightweight and more comfortable to be used in hot climates. For instance, at least one embodiment of the harness system may be as light as about one and one half pounds.

Still another advantage of this invention is that that shoulder harness may be integrated in a vest attached to the tree saddle.

Another advantage of this invention is that the harness system may be integrated with coveralls.

These and other features and advantages of the present invention will become apparent after review of the following drawings and detailed description of the disclosed embodiments.

BRIEF DESCRIPTION OF THE DRAWINGS

The accompanying drawing, which is incorporated in and form a part of the specification, illustrate preferred embodiments of the presently disclosed invention(s) and, together with the description, disclose the principles of the invention(s). These illustrative figures include the following.

DETAILED DESCRIPTION

Figure 1:
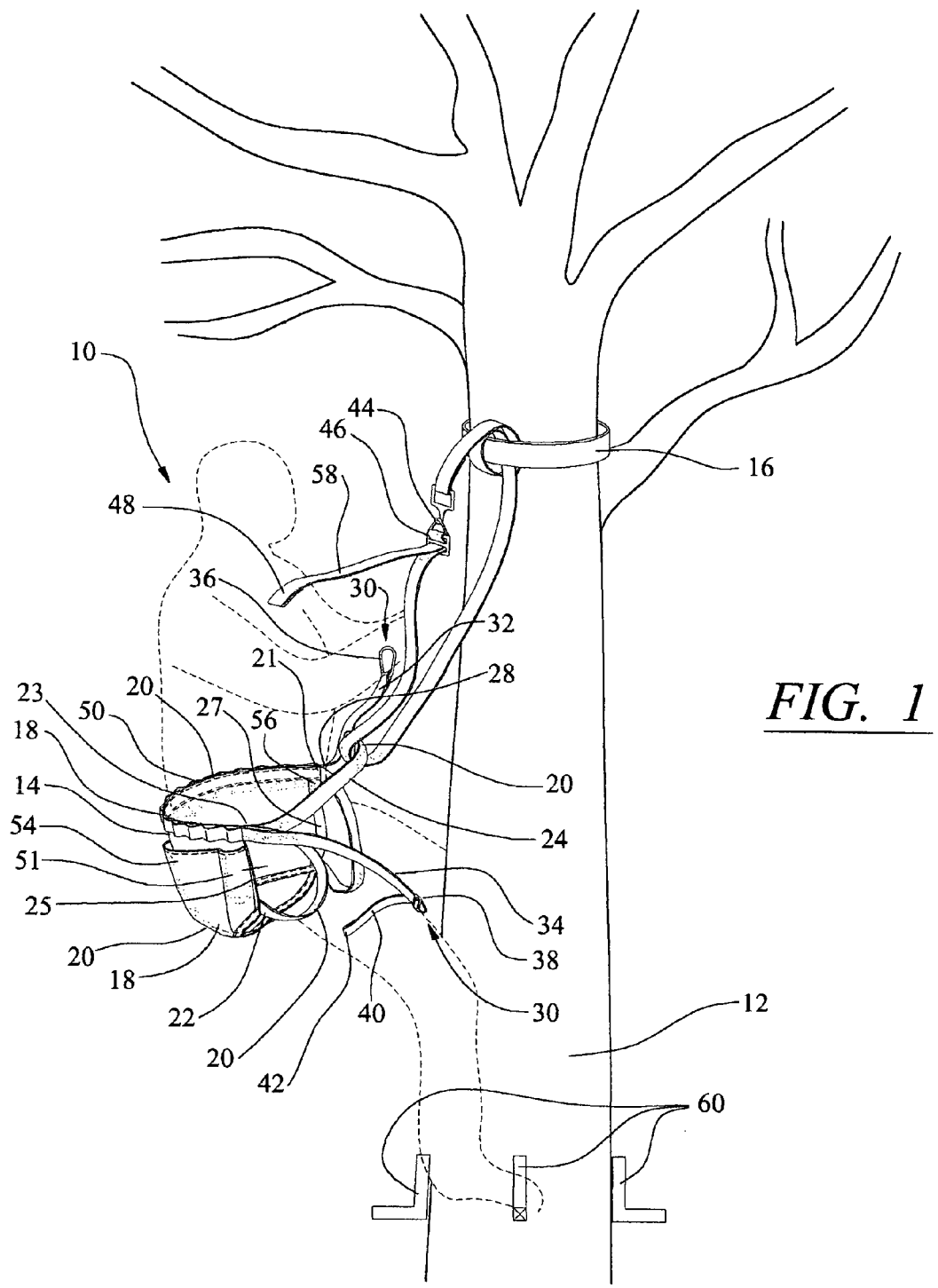
FIG. 1 is side perspective view of a harness according to one or more aspects of this invention.
Figure 2:
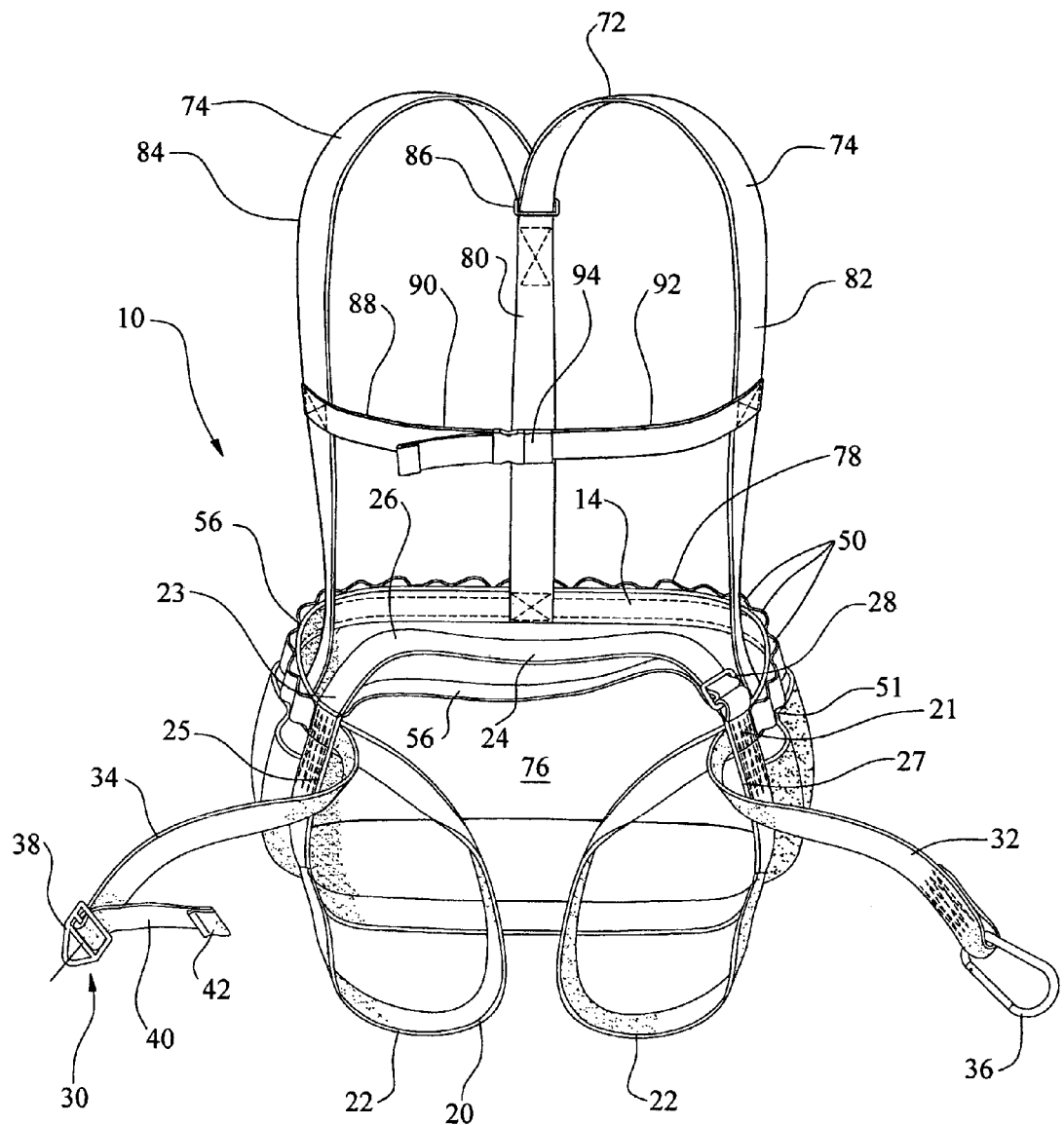
FIG. 2 is a frontal perspective view of the harness shown in FIG. 1.

FIGS. 1 and 2 illustrate a harness 10 capable of supporting a person off of a ground surface by hanging from a support object 12. Support object 12 may be, but is not limited to, a tree, a building, a rope, a rock face, a telephone pole, a power pole, or other such device. Harness 10 includes a seat 14 for supporting a person and a hanging strap 16 for coupling the seat 14 to a support object 12. Seat 14 may be composed of numerous materials, such as, but not limited to, leather, nylon, CORDURA, neoprene, any combination of these materials, and other natural and synthetic fabrics and materials. Any of these materials, or other appropriate materials, may be formed into a mesh to reduce heat build up by a user. Seat 14 may be formed from a material that is substantially silent when contact such that relatively little, if not no, noise is produced when the fabric is contacted. Seat 14 is configured to fit loosely around the buttocks and hips of a person and to conform to the shape of a person. Seat 14 may have one or more sizes to accommodate small children and large adults. Seat 14 may include a first top corner 21, a second top corner 23, a first side edge 25, and a second side edge 27.

A periphery 18 of seat 14 may be supported and reinforced with a strap 20. Strap 20 may be attached to periphery 18 of seat 14 and form leg containing loops 22 that act as a safety mechanism. In at least one embodiment, leg containing loops 22 may include a first leg containing loop coupled to first side edge 25 and a second leg containing loop coupled to a second side edge 27. Leg containing loops 22 may be formed from a single strap that is also coupled to periphery 18 of seat 14. When a person is seated in seat 14, leg containing loops 22 loosely surround the legs of the person and do not restrict the person's ability to move or change positions. Leg containing loops 22 support the weight of a person if the person falls from seat 14.

Figure 4:
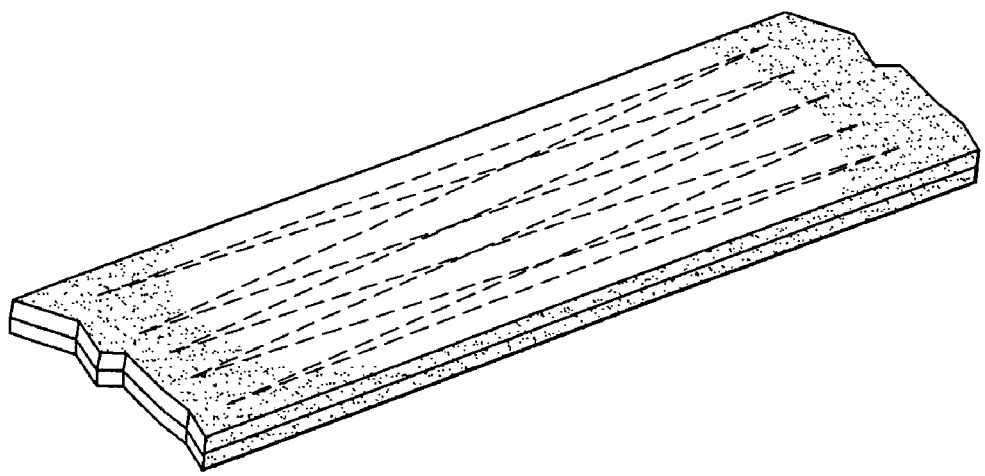
FIG. 4 is a detail of a stitch pattern.

In other embodiments, strap 20 may be composed of more than one strap. Strap 20 may be coupled to seat 14 using stitching or other attachment mechanisms. In one embodiment as shown in FIG. 4, the stitching may formed from a "WW" stitch pattern. The "WW" pattern may be about 6 inches long to secure the loose ends of strap 16 to seat 14 with maximum strength. The "WW" stitch pattern may have a minimum weight bearing capacity of about 500 pounds.

Figure 7:
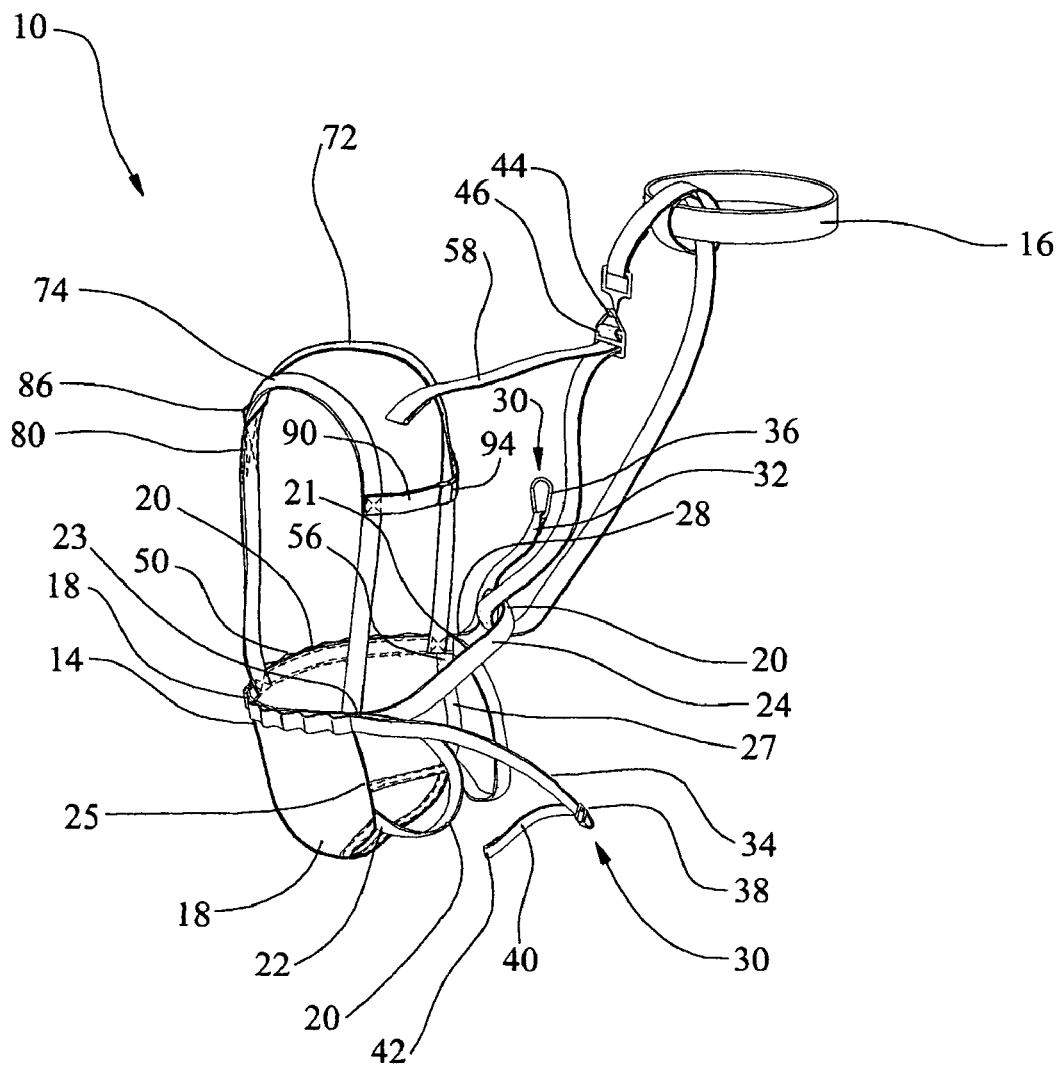
FIG. 7 is a perspective view of an alternative embodiment of the harness including a shoulder strap.

Strap 20 may provide sufficient structure to the harness 10 such that the material forming the seat 14 may be varied during the manufacturing process, as shown in FIG. 7. Strap 20 may be assembled such that replacement of seat 14 may be easily accomplished. In addition, the seat material 14 may be releasably attached to the strap 20 such that during normal operation, the seat 14 remains attached to the strap 20, but may be removed and replaced with a seat 14 made of a different material. Replacement of the seat 14 may be desired to accommodate the harness 10 to different weather conditions. During the assembly process, the strap 20 may be assembled regardless of the type of material forming the seat 14. Thus, orders may be received for different types of seat 14 materials, and the orders may be rapidly filled by simply attaching the seat 14 to the strap 20.

Harness 10 may also include waist strap 24, as shown in FIGS. 1, 2, and 7. Waist strap 24 may be formed from top strap section 26 and bottom strap section 56, as shown in FIG. 2. In one embodiment, waist strap 24 extends between top corner 21 and top corner 23. Top strap section 26 may be capable of receiving hanging strap 16 to couple harness 10 to a support object 16, and bottom strap section 56 may be capable of pulling top corners 21 and 23 of seat 14 together to secure waist strap 24 and seat 14 to a person. Top strap section 26 and a bottom strap section 56 may each have a weight bearing capacity of at least 500 lbs. In other embodiments, waist strap 24 may have other amounts of strength. Waist strap 24 can be tightened or loosened around the waist of a person by pulling top strap section 26 through fastener 28. In one embodiment, waist strap 24 is formed from overlapping layers of straps, bottom strap section 56 is capable of being fastened tightly against the waist of a person seated in seat 14 while top strap section 26 may form a loop to receive hanging strap 16 for supporting seat 14.

The lengths of top strap section 26 and bottom strap section 56 of waist strap 24 may be adjusted using fastener 28. In at least one embodiment, fastener 28 may have a load bearing capacity of at least 500 pounds and may be coated with a material, such as, but not limited plastic, rubber, or other material for noise reduction. Fastener 28 enables waist strap 24 to be adjusted without having to disconnect waist strap 24, thereby never putting the person in danger of falling from support object 12. In addition, waist strap 24 may be adjusted while waist strap 24 supports the entire weight of a person seated in seat 14. Waist strap 24 may be adjusted by pulling on top strap section 26 or bottom strap section 56 depending on whether waist strap is desired to be tightened or loosened around the waist of a person. In at least one embodiment, fastener 28 may be coupled to top corner 23 of seat 14 In another embodiment, the waist strap 24 need not be tightened against the waist of a user. Instead, the waist strap 24 may be made of even lengths of material and supported evenly by the hanging strap 16.

In at least one embodiment, a single strap may be used to form strap 20 and waist strap 24. The single strap wraps around periphery 18 of seat 14, forms leg containing loops 22 and forms top strap section 26 and bottom strap section 56 by passing through fastener 28. Using a single strap reduces the number of stitched connections to a single connection. Thus, the single strap may improve the reliability and safety of harness 10.

Figure 9:
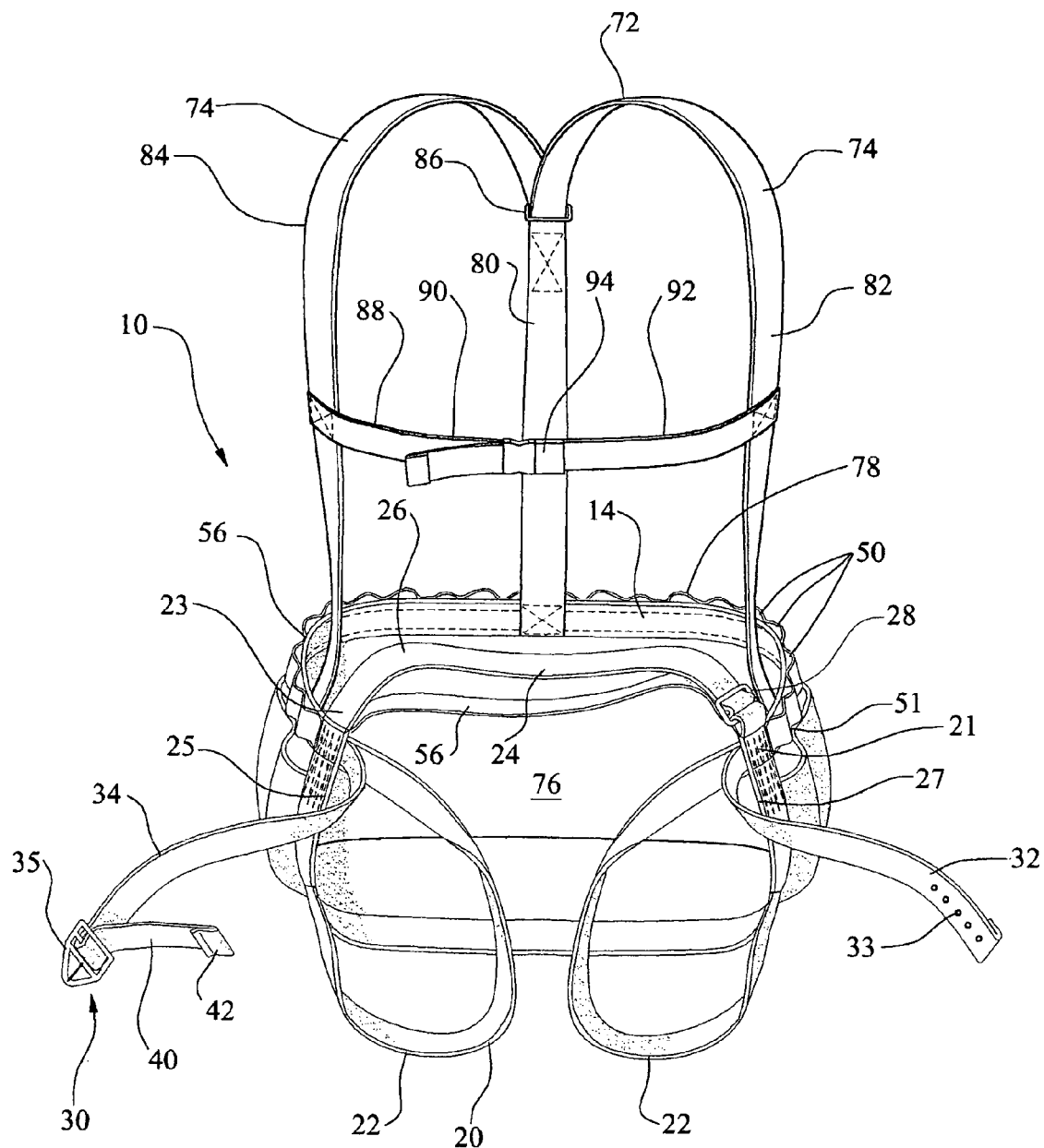
FIG. 9 is a perspective view of an alternative embodiment of the invention with an alternative connection systems for the climbing strap.

Harness 10 may further include a climbing strap 30 for assisting a person while climbing a support object 12 until the person has coupled top strap section 26 of waist strap 24 to hanging strap 16. Climbing strap 30 may be used while climbing or descending a support object 12 and while the person is attaching or detaching the hanging strap 16 to the support object 12. Climbing strap 30 may be formed from a single strap formed from a first side strap section 32 and a second side strap section 34. In other embodiments, climbing strap 30 may be formed from two or more straps. First side strap section 32 may be coupled to first side edge 25, and second side strap section 34 may be coupled to second side edge 27. First side strap section 32 may include a hook 36 sized to be received by fastener 38 that is coupled to second side strap section 34. In another embodiment, the first and second side strap sections 32, 34 may be coupled together using a plurality of adjustment holes 33 and a buckle 35, as shown in FIG. 9. The length of first side strap section 32 may or may not be adjustable. Alternatively, the length of both the first side strap 32 and the second side strap 34 may be adjustable. In an alternative embodiment, climbing strap 30 formed from a single strap may be attached to "D" rings, or other similar fasteners, attached to first top corner 21 or a second top corner 23, respectively.

In one embodiment, fastener 38 has a weight bearing capacity of about 500 pounds and may be coated with a protection material to reduce sound, such as, but not limited to, plastic, rubber or a wear resistant paint. Fastener 38 may be in the shape of a V-ring or webbing ring, which reduces noise during use. First and second side strap section 32, 34 may also have a length of three of more feet. During use, first side strap section 32 and second side strap section 34 are wrapped around the circumference of a support object 12, and fastener 38 is coupled to hook 36. The length of climbing strap 30 may then be adjusted using loose end 40. Some slack should be left in climbing strap 30 to enable a person to climb a support object 12. The climbing strap 30 may be tightened around the tree to bring a person seated in seat 14 closer to the tree by pulling on loose end 40. Climbing strap 30 may also include a stop 42, such as, but not limited to, a butterfly end stop, for preventing accidental removal of fastener 38 from climbing strap 30.

Seat 14 may be coupled to a support object 12 using hanging strap 16, as shown in FIG. 1. Seat 14 and hanging strap 16 are configured so that when a person or other object is supported by the seat 14, the center of gravity of the person is below the pivot points, where are the top corners 21 and 23 of the seat 14. As a result, the seat 14 is stable and prevents a person from flipping over in the seat 14 during use.

Figure 3:
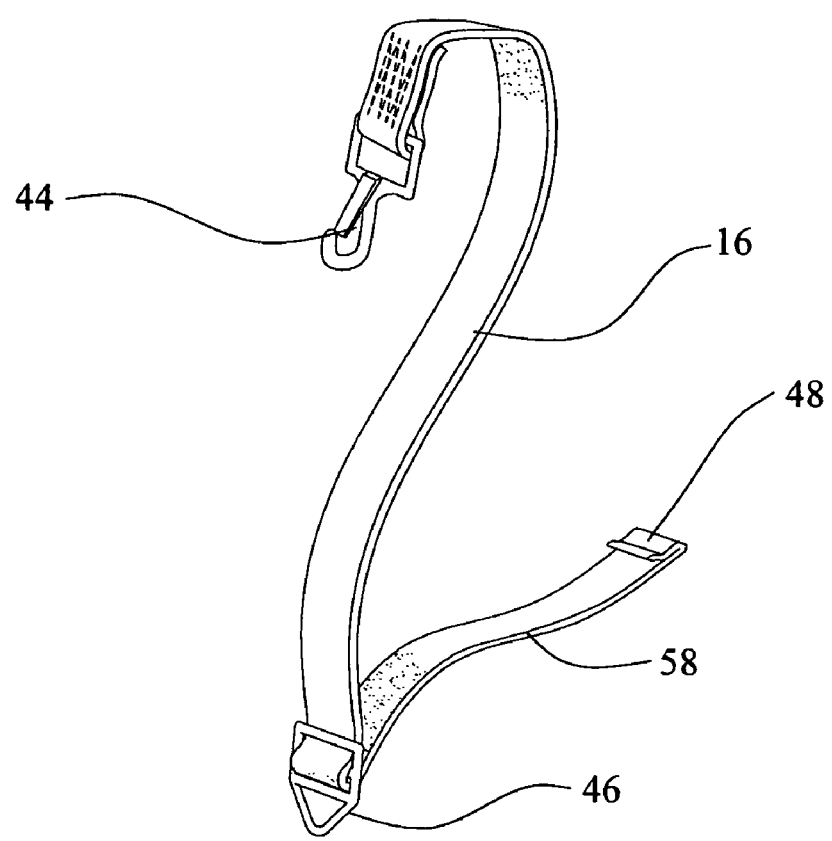
FIG. 3 is a perspective view of a hanging strap.

Hanging strap 16, as shown in FIGS. 1 and 3, may vary in length and strength, but in one embodiment, hanging strap 16 is about 12 feet long and formed from a strap having a width of about 1¾ inches and weight bearing capacity within the range between about 500 pounds to about 12,000 pounds. In other embodiments, hanging strap 16 may be shorter than 12 feet or longer than 12 feet, and, in one embodiment, may be as along as 100 feet. Hanging strap 16 may include a releasable hook 44 attached to one end and a fastener 46 slidably coupled to hanging strap 16. In one embodiment, releasable hook 44 may have a weight bearing capacity of about 500 pounds, and fastener 46 may have a weight bearing capacity within a range between about 500 pounds and about 2,500 pounds. Fastener 46 may also be coated with a protection material to reduce sound, such as, but not limited to, plastic, rubber, or a relatively wear resistant paint, or other item. Fastener 46 may be in the shape of a V-ring, which reduces noise during use.

Releasable hook 44 may be attached to hanging strap 16 by feeding hanging strap 16 through a connection ring on releasable hook 44 and coupling hanging strap 16 to itself using, for instance, stitching. In one embodiment, a stitch pattern, such as, but not limited to, a "WW" stitch pattern shown in FIG. 4, having a weight bearing capacity of between about 500 pounds to more than about 3,000 pounds may be used to secure releasable hook 44 to hanging strap 16. Hanging strap 16 may also include a stop 48 at the end of hanging strap 16 opposite the releasable hook 44 to prevent fastener 46 from being removed from hanging strap 16. Stop 48 may be, but is not limited to, a butterfly stop.

Harness 10 may also include numerous pouches 54 coupled to seat 14 for storing first side strap section 32 and second side strap section 34 of climbing strap 30 while not being used; hunting aides, such as calls, hand warmers, gloves, insect repellant, thermoses, scents, binoculars, hats, and drinks; and other such items. Pouch 54 may form a significant portion of a backside surface of the seat 14, as shown in FIG. 1. Pouch 54 may have a closure mechanism such as, but not limited to: a drawstring; a flap; a releasable, reusable attachment device such as, but not limited to, VELCRO, or a zipper; or other mechanism. Harness 10 may also include one or more side pouches 51. Side pouches 51 may have different sizes to store and protect numerous items. Side pouches 51 and pouch 54 may be composed of any durable material, such as leather, CORDURA, nylon, mesh, neoprene, or other appropriate material.

In one embodiment, as shown in FIG. 1, harness 10 may include pouch loops 50 formed from strap 16 for receiving modular pouches that may be attached to the harness 10 for holding various items, such as flashlights, pocket knives, and other items having attachment clips. Pouch loops 50 may be formed with generally vertical stitching forming a plurality of vertical lines spaced apart from each other. In one embodiment, pouch loops 50 may be about two inches wide. Pouch loops 50 may be formed using strap climbing strap 30 where climbing strap 30 is attached to periphery 18 of seat 14. The harness 10 may include a single pouch loop 50 or a plurality of pouch loops 50 located at an upper perimeter of the harness 10.

Figure 5:
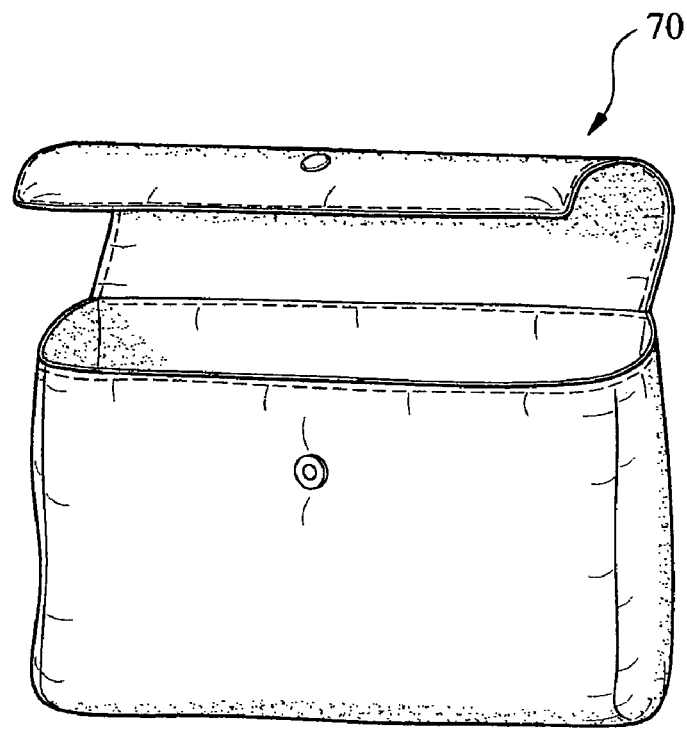
FIG. 5 is a frontal perspective view of a modular pouch of this invention.
Figure 6:
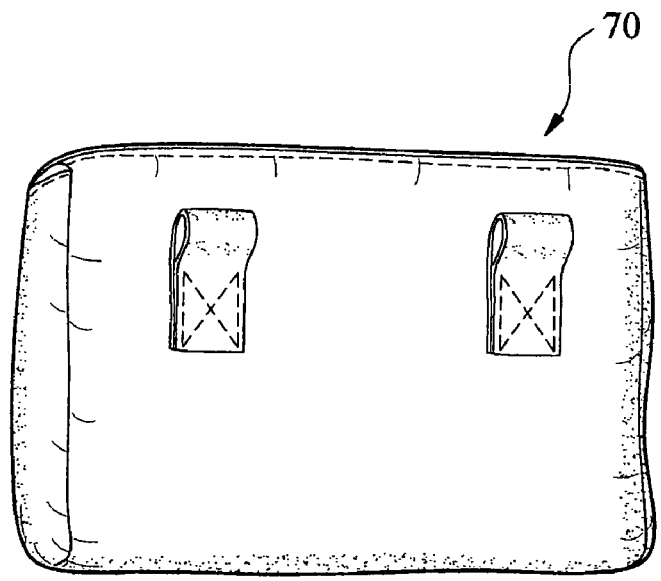
FIG. 6 is a rear perspective view of a modular pouch of this invention.

In an alternative embodiment, as shown in FIGS. 5–6, harness 10 may include one or more modular pouches 70 attached to the harness 10. The modular pouches 70 may be, but are not limited to being, releasably attached to the harness 10. The modular pouches 70 may be attached to the harness 10 using one or more of the pouch loops 50. In at least one embodiment, the modular pouches 70 may be attached to the harness 10 using straps, zippers, hoop and loop connectors, and other releasable connection devices. The modular pouches 70 may be configured to contain a number of items. For instance, when the harness 10 is outfitted for hunting applications, modular pouches may be attached to the harness 10 that are configured to hold binoculars, a thermos or water bottle, or both, game calls, insect repellant, tree steps, a tree saw, a climbing strap 30, or other items. These pouches may be referred to as a thermos pouch, a binoculars pouch, a game call pouch, a tree step pouch, a climbing strap pouch, a hanging strap pouch, and a tree saw pouch. A single modular pouch 70 may store each of these items. In another embodiment, a modular pouch 70 may hold only one item. In yet other embodiment, the modular pouch 70 may hold two or more of these items. The modular pouch 70 may have on or more openings that may be closed with a hook and fastener connector, a zipper, or other appropriate connector.

Should the harness 10 be needed to be used for an application other than for hunting, the modular pouches 70 may be removed and replaced with modular pouches 70 having other configurations accepting other items. The modular pouches 70 may also be removed from the harness 10 and not replaced. There may be situations in which the harness 10 may be used without a modular pouch 70 in order to reduce the weight of the harness 10 or to be used for an application in which the modular pouches 70 may interfere with an activity or are unnecessary.

The modular pouches 70 may be formed from a variety of materials. Some applications may include use of a waterproof material, such as neoprene or others. Other applications may include use of a fabric that is breathable or ventilated, such as nylon mesh and others. In other applications, the modular pouches 70 may include drainage holes. The harness system 10 may be made to be extremely lightweight, such as only about two pounds, in embodiments where the modular pouches 70 and the seat 14 are formed from vented materials. Such lightweight embodiments enable the harness 10 to be used in a wider variety of applications and are particularly well suited for use in hot climates.

The harness 10 may also include a shoulder strap 72, as shown in FIG. 2. The shoulder strap 72 may be used to transfer at least a portion of the weight of the harness 10 to the shoulders of a user. The shoulder strap 72 may also be used as a safety device to prevent a person to which the harness 10 is attached from falling out of the harness 10 in the event the person is turned upside down while being suspended by the harness 10. In fact, use of the shoulder strap 72 with the harness has qualified the harness 10 for classification as a fall arrest system with the Treestand Manufacturers' Association. The shoulder strap 72 may be any device capable of preventing a person from falling from the harness 10. In at least one embodiment, as shown in FIG. 2 the shoulder strap 72 may be a formed from a Y-shaped web forming a loop 74 above the seat 14. The loop 74 may be formed by the shoulder strap 72 extending from a frontside 76 of the harness 10 over one or more shoulders of a user and attached to a backside 78 of the harness 10. The Y-shaped shoulder strap 72 may include have a single web 80 coupled to the backside 78 of the harness 10 and two webs 82 and 84 extending from the backside web 80, over the shoulders of a user, to the frontside 76 of the harness 10. The shoulder strap 72 may be attached to the harness 10 through webbing loops, which are similar to pouch loops 50, on the seat 14. The shoulder strap 72 may be detachable.

A fastener 86 may be used to adjust the size of the loop 74. In at least one embodiment, the fastener 86 may be coupled to the web 80 on the backside 78 of the harness 10, rather than on the frontside 76 of the harness 10 to eliminate any interference that may be caused by the fastener 86. For instance, by locating the fastener 86 on the backside 78, the fastener 86 is not in position to interfere with operation of a bow and arrow, such as with a bow string when a bow is drawn, use of a firearm, use of tools, or other operations. Thus, safety is not compromised and noise is kept at a minimum with the shoulder strap 72. One end of the web 80 may be secured to the harness 10 and another end passed through the fastener 86, which enables the size of the loop 74 to be adjusted. The shoulder strap 72 may be secured snuggly around the chest of a user with the fastener 86.

Webs 82 and 84 of the shoulder strap 72 may be controlled using a chest adjustor 88. The chest adjustor 88 may be formed from any device capable of controlling the position of webs 82 and 84. In at least one embodiment, the chest adjustor 88 may be formed from a two straps 90, 92 coupled together with a releasable connector 94. The length of the straps 90, 92 may be adjusted at the releasable connector 94.

Figure 8:
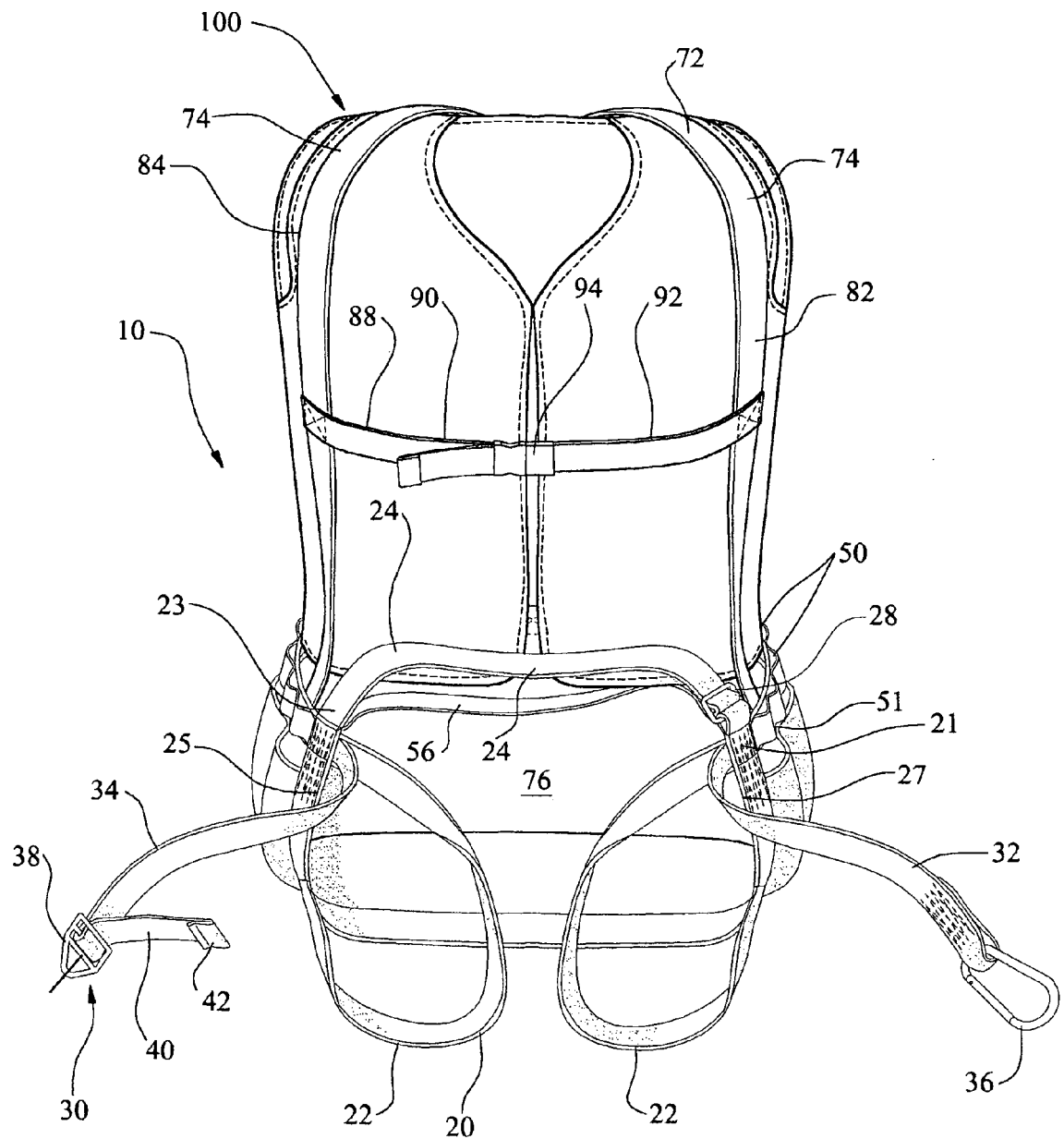
FIG. 8 is a perspective view of an alternative embodiment of the invention in which the shoulder straps are integrated with a vest.

In an alternative embodiment, as shown in FIG. 8, the shoulder strap 72 may be integrated in a vest 100. The vest 100 may be sized to fit around the chest of a user. The vest 100 may be offered in different sizes to accommodate different sized users. The shoulder straps 74 may be included in the vest 100. The vest 100 may or may not be a flotation device.

Harness 10 may be used for numerous purposes. For instance, harness 10 may be used as a tree stand for suspending hunters in a tree above the ground while hunting. The hunter may be suspended anywhere between a few feet above the ground to more than sixty feet above the ground. Harness 10 may also be used by hunters to trim the limbs from trees in the woods. Harness 10 may also be used by other people to trim limbs from trees growing in subdivisions, on golf courses, on school grounds and in other locales. Further, harness 10 may be used as a repelling harness by firefighters and other rescue personnel, high rise building window washers, electric utility workers, and others. Thus, harness 10 may be used for any purpose in which a person needs to be suspended from the ground in a safe manner while having the freedom of movement to achieve numerous tasks.

Harness 10 may be used by a person first placing harness 10 around buttocks of a person. The person may step into harness 10 by stepping through the gap between waist strap 24 and seat 14, putting a leg through each leg containing loop 22 and placing seat 14 in contact with the buttocks of the person. Waist strap 24 may then tightened using fastener 28 to secure harness 10 around the waist of the person. Adjusting the length of waist strap 24 causes the bottom strap section 56 of waist strap 24 to be tightened against the waist of the person and the top strap section 26 to form a loop with slack that is capable of being attached to hanging strap 16. The top strap section 26 may be tucked into a an elastic keeper until needed. The webs 82 and 84 forming the shoulder strap 72 may be pulled over the shoulders of the person. The shoulder strap 72 may be adjusted by adjusting the strap 72 at the fastener 86 located on the backside 78 of the harness 10. The webs 82 and 84 may be drawn together using the chest adjustor 88, which makes use of the shoulder strap 72 more comfortable. The person may then hike to his hunting location or scale a tree 12 if already beside the tree the person intends to climb. The person may climb the tree 12 in any manner possible. A common method of climbing trees is by using portable steps 60 having screws that easily screw into a tree. Portable steps 60 having other configurations may be attached to a tree 12 by wrapping a climbing strap 30 around the tree.

Preferably, before the person begins to climb the tree 12, first side strap section 32 and second side strap section 34 of climbing strap 30 are wrapped around the tree 12 and secured together using releasable hook 36 and fastener 38. The length of climbing strap 30 may be adjusted by pulling on the loose end 40 of climbing strap 30, which is proximate to stop 42. In other embodiments, the climbing strap 30 may be adjusted by placing hook 36 in an adjustment hole 33. The person may then climb the tree 12 using these portable steps 60 and limbs of the tree 12 where available until the person has reached a desired height. While climbing the tree 12, the person must guide the climbing strap 30 upward along the tree and prevent it from snagging bark during the climb. The climbing strap 30 must be momentarily disconnected to climb past limbs on tree 12. Thus, a tree that is the safest to climb with harness 10 is a tree having no branches on the trunk between the ground and the height to which the climber intends to climb. A climber climbing a tree 12 having this description will not have to disconnect climbing strap 30 until harness 10 is safely secured to the tree 12 using hanging strap 16. The climbing strap 30 is configured to be connected and disconnected using hook 36 while hugging a tree. In an alternative configuration, in which either the first or second strap 32, 34 are adjustable, the user determines placement of the hook 36 based on comfort and ease of use in a particular situation.

Once at the desired height above the ground, hanging strap 16 is retrieved from pouch and is secured to the tree 12. Hanging strap 16 may be secured to the tree 12 or tree limb in numerous manners. In one embodiment, hanging strap 16 is wrapped around the tree 12 one or more times above the person's head leaving the releasable hook 44 between about 6 and 16 inches from the tree 12. In another embodiment, hanging strap 16 is wrapped around tree 12 at least two times. The end of hanging strap 16 attached to releasable hook 44 is tied around hanging strap 16 between the tree 12 and hanging strap 16 so that releasable hook 44 hangs over the hanging strap 16 coupled to the tree 12. Fastener 46 coupled to hanging strap 16 is fed through a loop formed by waist strap 24 and attached to releasable hook 44. This forms two interlocking loops, which include: the loop formed by the waist strap 24 and the loop formed by the hanging strap 16. The interlocking loops formed by waist strap 24 and hanging strap 16 allow a person to turn easily from side to side and to face away from the support object 12 to which harness 10 is coupled. The person may now sit in seat 14 and be supported by hanging strap 16. This embodiment provides a user with increased mobility while seated in the harness 10 without compromising safety.

In yet another embodiment, a first person, who may be an experienced user, may attach the hanging strap 16 to the tree 12. A second person, who may be, but is not limited to, an inexperienced person, such as a child, may pass the hanging strap 16 through the waist strap 24 and attach the releasable hook 44 to the fastener 46 while the second person is on a ground surface. As the second person climbs the tree 12, the length of the hanging strap 16 may be adjusted.

In another embodiment, the waist strap 24 may remain tightened so that the bottom strap section 56 is tight and close to a user's waist, and the top strap section 26 forms a longer loop. The fastener 46 coupled to hanging strap 16 may be feed through a loop formed by top strap section 26 and attached to releasable hook 44; thus forming a two interlocking loops. This embodiment provides a user with an increased sense of security while seated in the harness 10 and forms the point safety harness.

The height at which the person is supported may be adjusted by pulling on adjusting end 58 of hanging strap 16. The person may either raise or lower the height at which seat 14 is positioned relative to the location at which hanging strap 16 is coupled to the tree. The height of the strap may be adjusted by the person holding the adjusting end 58 of the hanging strap 16 in one hand and the tree 12 with the other hand. The person can reduce the load on fastener 46 by holding the tree 12, thereby making the adjustment process easier when creating more distance between the seat 14 and the releasable hook 44 and the fastener 46. The person is most comfortable by adjusting the height of seat 14 so that about 60 percent of the person's weight is supported by seat 14 and the remaining 40 percent of the weight is supported by the person's feet. By enabling a climber to adjust the height of the climber's feet relative to the climber's waist, the climber can place himself in a comfortable position which is extremely important for big game hunting.

After hanging strap 1 has been attached to waist strap 24, first side strap section 32 and second side strap section 34 of climbing strap 30 may be disconnected and placed in side pouches 51, which may or may not be removable. Now, the person is free to move 360 degrees around the tree. In most situations, there may not exist enough limbs around the feet of the person to provide adequate support. In these situations, the person should position one or more portable steps 60 around the tree at the height of his or her feet when the person is in a normal or slightly elevated sitting position. Attaching steps 60 in this manner may be done after hanging strap 16 has been attached to waist strap 24 or while climbing the tree 12. These steps 60 provide the person with a platform for walking completely around the tree 12 and rotating to face the tree 12 or face directly away from the tree 12.

If the person determines that bottom strap section 56 of waist strap 24 is too tight or too loose, bottom strap section 56 may be adjusted by pulling bottom strap section 56 or top strap section 26 through fastener 28. This adjustment may be made while the person is seated in seat 14 and hanging from hanging strap 16. During the adjustment process, the user does not need to disconnect from the hanging strap 16; therefore, the safety of the user is not compromised while adjusting the waist strap 24.

The terms and expressions which have been employed herein are used as terms of description and not of limitation, and there is no intention, in the use of such terms and expressions, of excluding any equivalents of the features shown and described or portions thereof. Having thus described the invention in detail, it should be apparent that various modifications can be made in the present invention without departing from the spirit and scope of the following claims.

I claim:

1. A modular harness system for suspending a person off of a ground surface, comprising:
    a seat having a first top corner, a second top corner, a first side edge, and a second side edge opposite from the first side edge, the seat being supported by a single strap attached to the seat;
    at least one modular pouch coupled to the harness;
    the single strap forming a first leg containing loop, a second leg containing loop, and a waist strap, wherein the first leg containing loop is formed on the first side edge and the second leg containing loop is formed on the second side edge and wherein the waist strap extends between the first top corner and the second top corner and forms at least a top strap section and a bottom strap section that forms a closed loop of a fixed dimension, wherein the top strap section extends between the first top corner and the second top corner of the seat and the bottom strap section extends between the first top corner and the second top corner of the seat;
    a fastener affixed to one of said top corners with the waist strap threaded therethrough for adjusting lengths of the top strap section and the bottom strap section wherein shortening the bottom strap section lengthens the top strap section by an equal amount; and
    wherein the harness is capable of being supported by the top strap section of the waist strap.

2. The harness of claim 1, wherein the modular pouch is releasably coupled to the harness.

3. The harness of claim 1, further comprising at least one pouch loop coupled to the harness.

4. The harness of claim 3, wherein the modular poach is coupled to the at least one pouch loop.

5. The harness of claim 3, wherein the at least one pouch loop comprises a plurality of pouch loops extending around an upper perimeter of the harness.

6. The harness of claim 3, wherein the modular pouch comprises a plurality of modular pouches selected from the group consisting of a thermos pouch, a binoculars pouch, a game call pouch, a tree step pouch, a climbing strap pouch, a hanging strap pouch, and a tree saw pouch.

7. The harness of claim 3, wherein the modular pouch is formed from a fabric that is substantially silent when contacted.

8. The harness of claim 1, further comprising a shoulder strap forming a loop above the seat.

9. The harness of claim 8, wherein the shoulder strap is Y-shaped in which two webs are attached to the harness proximate to a frontside of the harness and a single web is attached to the harness proximate to a backside of the harness.

10. The harness of claim 9, wherein the shoulder strap is detachable.

11. The harness of claim 9, wherein the shoulder strap is attached to a loop on the seat.

12. The harness of claim 9, wherein the shoulder strap is formed from a single piece of webbing forming the Y-shaped shoulder strap.

13. The harness of claim 9, further comprising an adjustable fastener attached to the single piece of webbing attached to the harness proximate to a backside of the harness.

14. The harness of claim 1, wherein the waist strap is coupled to the first top corner of the harness, and the fastener is coupled to the second top corner of the seat.

15. The harness of claim 1, further comprising a hanging strap capable of being attached to a support object and supporting the seat by forming interlocking loops with the top strap section of the waist strap; wherein the hanging strap comprises a hook coupled to an end of the hanging strap and a fastener slidably coupled to the hanging strap for receiving the hook.

16. The harness of claim 15, wherein the banging strap is adapted to form a loop for grasping the waist strap, wherein the loop is adjustable without releasing the hook from the fastener.

17. The harness of claim 1, further comprising a climbing strap formed from a first strap section extending from the seat and a second strap section extending from the sear for loosely attaching the harness to a support object by the person seated in the harness.

18. The harness of claim 17, wherein the first strap section extends from the first side edge of the seat and includes a hook, and the second strap section extends from the second side edge of the seat and includes a connector for receiving the hook.

19. The harness of claim 18, wherein the connector is slidably coupled to the second strap.

20. The harness of claim 18, wherein the connector may be selected from the group consisting of a fastener, adjustment holes, and loops.

21. The harness of claim 17, wherein the climbing strap is formed from a single strap.

22. The harness of claim 17, wherein the climbing strap extends along a top edge of the seat from at least the first edge to the second edge and forms at least one pouch loop.

23. The harness of claim 17, wherein the first strap section and the second strap section are formed of straps having the same length.

24. The harness of claim 17, wherein the first strap section and the second strap section are formed of straps having different lengths.

25. A modular harness system a for suspending a person off of a ground surface, comprising:
    a seat having a first top corner, a second top corner, a first side edge, and a second side edge opposite from the first side edge, the seat being supported by a single strap attached to the seat;
    the single strap forming a first leg containing loop, a second leg containing loop, and a waist strap, wherein the first leg containing loop is formed on the first side edge and the second leg containing loop is formed on the second side edge and wherein the waist strap forms a closed loop of a fixed dimension and extends between the first top corner and the second lop corner and forms at least a top strap section and a bottom strap section;
    a plurality of pouch loops extending around an upper perimeter of the seat;
    at least one modular pouch releasably coupled to at least one of the plurality of pouch loops;
    a fastener affixed to one of said top corners with the waist strap threaded therethrough for adjusting lengths of the top strap section and the bottom strap section wherein shortening the bottom strap section lengthens the top strap section by an equal amount; and wherein the harness is capable of being supported by the top strap section of the waist strap.

26. The harness of claim 25, wherein the modular pouch comprises a plurality of modular pouches selected from the group consisting of a thermos pouch, a binoculars pouch, a game call pouch, a tree step pouch, a climbing strap pouch, a hanging strap pouch, and a tree saw pouch.

27. The harness of claim 25, wherein the modular pouch is formed from a fabric that is substantially silent when contacted.

28. The harness of claim 25, further comprising a shoulder strap forming a loop above the seat.

29. The harness of claim 28, wherein the shoulder strap is Y-shaped in which two webs formed from a single piece of webbing are attached to the harness proximate to a frontside of the seat and a single web attached to the harness proximate to a backside of the seat.

30. The harness of claim 29, further comprising an adjustable fastener attached to the single web attached to the harness proximate to a backside of the seat.

31. The harness of claim 25, wherein the waist strap is coupled to the first top corner of the seat and the fastener is coupled to the second top corner of the seat.

32. The harness of claim 25, further comprising a hanging strap capable of being attached to a support object and supporting the seat by forming interlocking loops with the top strap section of the waist strap.

33. The harness of claim 32, wherein the hanging strap comprises a hook coupled to an end of the hanging strap and a fastener slidably coupled to the hanging strap for receiving the hook, and wherein the hanging strap is adapted to form a loop for grasping the top strap section of the waist strap and the loop is adjustable without releasing the hook from the fastener.

34. The harness of claim 25, further comprising a climbing strap formed from a first strap section extending from a first side edge of the seat and a second strap section extending from a second side edge of the seat, wherein the first strap section includes a hook and a second strap section includes a fastener for receiving the hook.

35. The harness of claim 34, wherein the climbing strap is formed from a single strap.

36. The harness of claim 34, wherein the climbing strap extends along a top edge of the seat from at least the first edge to the second edge and forms at least one pouch loop.

37. The harness of claim 25, wherein the strap and the waist strap are formed from one continuous strap.

38. A modular harness system for suspending a person off of a ground surface, comprising:
    a seat having a first top corner, a second top corner, a first side edge, and a second side edge opposite from the first side edge, the seat being supported by a single strap attached to the seat;
    the single strap forming a first leg containing loop, a second leg containing loop, and a waist strap, wherein the first leg containing loop is formed on the first side edge and the second leg containing loop is formed on the second side edge and wherein the a waist strap extends between the first top corner and the second top corner and forms at least a top strap section and a bottom strap section that forms a closed loop of fixed dimension;
    a fastener affixed to one of said top corners with the waist strap threaded therethrough for adjusting lengths of the top strap section and the bottom strap section wherein shortening the bottom strap section lengthens the top strap section by an equal amount;
    a shoulder strap forming a loop above the seat; and
    wherein the harness is capable of being supported by the top strap section of the waist strap.

39. The harness of claim 38, wherein the shoulder strap is Y-shaped in which two webs are attached to the harness proximate to a frontside of the seat and a single web attached to the harness proximate to a backside of the seat.

40. The harness of claim 39, wherein the shoulder strap is formed from a single piece of webbing forming the Y-shaped shoulder strap.

41. The harness of claim 40, further comprising an adjustable fastener attached to the single web attached to the harness proximate to a backside of the seat for adjusting the loop is formed by the shoulder strap.

42. The harness of claim 38, further comprising at least one modular pouch.

43. The harness of claim 42, wherein the modular pouch is releasably coupled to the harness.

44. The harness of claim 42, further comprising at least one pouch loop coupled to the seat.

45. The harness of claim 44, wherein the modular pouch is coupled to the at least one poach loop.

46. The harness of claim 44, wherein the at least one pouch loop comprises a plurality of pouch loops extending around an upper perimeter of the seat.

47. The harness of claim 42, wherein the modular pouch comprises a plurality of modular pouches selected from the group consisting of a thermos pouch, a binoculars pouch, a game call pouch, a tree step pouch, a climbing strap pouch, a hanging strap pouch, and a tree saw pouch.

48. The harness of claim 41, wherein the modular pouch is formed from a fabric that is substantially silent when contacted.

49. The harness of claim 38, wherein the waist strap is coupled to the first top corner of the seat and the fastener is coupled to the second top corner of the seat.

50. The harness of claim 38, further comprising a hanging strap capable of being attached to a support object and supporting the seat by forming interlocking loops with the top strap section of the waist strap; wherein the hanging strap comprises a hook coupled to an end of the hanging strap and a fastener slidably coupled to the hanging strap for receiving the hook.

51. The harness of claim 50, wherein the hanging strap is adapted to form a loop for grasping the top strap section of the waist strap, wherein the loop is adjustable without releasing the hook from the fastener.

52. The harness of claim 38, further comprising a climbing strap formed from a first strap section extending from the seat and a second strap section extending from the seat.

53. The harness of claim 52, wherein the first strap section extends from the first side edge of the seat and the second strap section extends from the second side edge of the seat, wherein the first strap section includes a hook and the second strap section includes a fastener for receiving the hook.

54. The harness of claim 52, wherein the climbing strap is formed from a single strap.

55. The harness of claim 52, wherein the climbing strap extends along a top edge of the seat from at least the first edge to the second edge and forms at least one pouch loop.

56. The harness of claim 38, further comprising a vest in which the shoulder strap is incorporated.

57. The harness of claim 38, further comprising coveralls in which the shoulder strap is incorporated.

* * * * *

UNITED STATES PATENT AND TRADEMARK OFFICE
CERTIFICATE OF CORRECTION

PATENT NO. : 7,063,185 B2
APPLICATION NO. : 10/992990
DATED : June 20, 2006
INVENTOR(S) : Green, Sherry Jean It is certified that error appears in the above-identified patent and that said Letters Patent is hereby corrected as shown below:

Column 13, line 41, replace "poach" with --pouch--.
Column 14, line 15, replace "banging" with --hanging--
Column 14, line 57, replace "lop" with --top--
Column 16, line 22, replace "poach" with --pouch--
Column 16, line 32, replace "41" with --42--

Signed and Sealed this

Fifth day of September, 2006

JON W. DUDAS
*Director of the United States Patent and Trademark Office*